(12) United States Patent
Johnson

(10) Patent No.: US 6,321,321 B1
(45) Date of Patent: Nov. 20, 2001

(54) SET-ASSOCIATIVE CACHE-MANAGEMENT METHOD WITH PARALLEL AND SINGLE-SET SEQUENTIAL READS

(75) Inventor: Mark W. Johnson, Hoffman Estates, IL (US)

(73) Assignee: VLSI Technology, Inc., San Jose, CA (US)

(*) Notice: Subject to any disclaimer, the term of this patent is extended or adjusted under 35 U.S.C. 154(b) by 0 days.

(21) Appl. No.: 09/337,089

(22) Filed: Jun. 21, 1999

(51) Int. Cl.[7] .................................................. G06F 9/32
(52) U.S. Cl. ........................................... 711/217; 711/218
(58) Field of Search ..................................... 711/128, 144, 711/145, 213, 217, 218, 219; 712/240, 245, 207; 710/52, 54, 55

(56) References Cited

U.S. PATENT DOCUMENTS

| | | | |
|---|---|---|---|
| 5,287,482 | * 2/1994 | Arimilli et al. | 711/130 |
| 5,367,653 | * 11/1994 | Coyle et al. | 711/128 |
| 5,371,870 | * 12/1994 | Goodwin et al. | 710/52 |
| 5,461,718 | * 10/1995 | Tatosian et al. | 711/206 |
| 5,854,911 | * 12/1998 | Watkins | 712/207 |

* cited by examiner

*Primary Examiner*—B. James Peikari
(74) *Attorney, Agent, or Firm*—Clifton Anderson

(57) ABSTRACT

A set-associative cache-management method utilizes both parallel reads and single-cycle single-set reads. The parallel reads involve accessing data from all cache sets in parallel before a tag match is determined. Once a tag match is determined, it is used to select the one of the accessed cache memory locations to be coupled to the processor for the read operation. Single-cycle single-set reads occur when the line address of one read operation matches the line address of a immediately preceding read operation satisfied from the cache. In such a case, only the set from which the previous read request was satisfied is accessed in the present read operation. If a sequential read operation is indicated, the same-set can also be accessed to the exclusion of the other sets provided the requested address does not correspond to the beginning of a line address. (In that case, the sequential read crosses a cache-line boundary.) However, the invention further provides for comparing the tag at the same-set location with the successor index with the tag associated with a location from which a read request was satisfied. If the next read request matches the common tag and the index of the successor location, a single-set read is also used. The single-set reads save power relative to the parallel reads, while maintaining the speed advantages of the parallel reads over serial "tag-then-data" reads.

2 Claims, 5 Drawing Sheets

SET-ASSOCIATIVE CACHE-MANAGEMENT METHOD WITH PARALLEL AND SINGLE-SET SEQUENTIAL READS

BACKGROUND OF THE INVENTION

The present invention relates to computers and, more particularly, to a method for managing a set-associative cache. A major objective of the present invention is to reduce the average power consumed during single-cycle read operations in a set-associative cache that employs parallel reads.

Much of modern progress is associated with the increasing prevalence of computers. In a conventional computer architecture, a data processor manipulates data in accordance with program instructions. The data and instructions are read from, written to, and stored in the computer's "main" memory. Typically, main memory is in the form of random-access memory (RAM) modules.

A processor accesses main memory by asserting an address associated with a memory location. For example, a 32-bit address can select any one of up to $2^{32}$ address locations. In this example, each location holds eight bits, i.e., one "byte" of data, arranged in "words" of four bytes each, arranged in "lines" of four words each. In all, there are $2^{30}$ word locations, and $2^{28}$ line locations.

Accessing main memory tends to be much faster than accessing disk and tape-based memories; nonetheless, even main memory accesses can leave a processor idling while it waits for a request to be fulfilled. To minimize such latencies, a cache can intercept processor requests to main memory and attempt to fulfill them faster than main memory can.

To fulfill processor requests to main memory, caches must contain copies of data stored in main memory. In part to optimize access times, a cache is typically much less capacious than main memory. Accordingly, it can represent only a small fraction of main-memory contents at any given time. To optimize the performance gain achievable by a cache, this small fraction must be selected strategically.

In the event of a cache "miss", i.e., when a request cannot be fulfilled by a cache, the cache fetches an entire line of main memory including the memory location requested by the processor. Addresses near a requested address are more likely than average to be requested in the near future. By fetching and storing an entire line, the cache acquires not only the contents of the requested main-memory location, but also the contents of the main-memory locations that are relatively likely to be requested in the near future.

Where the fetched line is stored within the cache depends on the cache type. A fully-associative cache can store the fetched line in any cache storage location. Typically, any location not containing valid data is given priority as a target storage location for a fetched line. If all cache locations have valid data, the location with the data least likely to be requested in the near term can be selected as the target storage location. For example, the fetched line might be stored in the location with the least recently used data.

The fully-associative cache stores not only the data in the line, but also stores the line-address (the most-significant 28 bits) of the address as a "tag" in association with the line of data. The next time the processor asserts a main-memory address, the cache compares that address with all the tags stored in the cache. If a match is found, the requested data is provided to the processor from the cache.

In a fully-associative cache, every cache-memory location must be checked for a tag match. Such an exhaustive match checking process can be time-consuming, making it hard to achieve the access speed gains desired of a cache. Another problem with a fully-associative cache is that the tags consume a relatively large percentage of cache capacity, which is limited to ensure high-speed accesses.

In a direct-mapped cache, each cache storage location is given an index which, for example, might correspond to the least-significant line-address bits. For example, in the 32-bit address example, a six-bit index might correspond to address bits 23–28. A restriction is imposed that a line fetched from main memory can only be stored at the cache location with an index that matches bits 23–28 of the requested address. Since those six bits are known, only the first 22 bits are needed as a tag. Thus, less cache capacity is devoted to tags. Also, when the processor asserts an address, only one cache location (the one with an index matching the corresponding bits of the address asserted by the processor) needs to be examined to determine whether or not the request can be fulfilled from the cache.

In a direct-mapped cache, a line fetched in response to a cache miss must be stored at the one location having an index matching the index portion of the read address. Previously written data at that location is overwritten. If the overwritten data is subsequently requested, it must be fetched from main memory. Thus, a directed-mapped cache can force the overwritting of data that may be likely to be requested in the near future. The lack of flexibility in choosing the data to be overwritten limits the effectiveness of a direct-mapped cache.

A set-associative cache has memory divided into two or more direct-mapped sets. Each index is associated with one memory location in each set. Thus, in a four-way set associative cache, there are four cache locations with the same index, and thus, four choices of locations to overwrite when a line is stored in the cache. This allows more optimal replacement strategies than are available for direct-mapped caches. Still, the number of locations that must be checked, e.g., one per set, to determine whether a requested location is represented in the cache is quite limited, and the number of bits that need to be compared is reduced by the length of the index. Thus, set-associative caches combine some of the replacement strategy flexibility of a fully-associative cache with much of the speed advantage of a direct-mapped cache.

The index portion of an asserted address identifies one cache-line location within each cache set. The tag portion of the asserted address can be compared with the tags at the identified cache-line locations to determine whether there is a hit (i.e., tag match) and, if so, in what set the hit occurs. If there is a hit, the least-significant address bits are checked for the requested location within the line; the data at that location is then provided to the processor to fulfill the read request.

A read operation can be hastened by starting the data access before a tag match is determined. While checking the relevant tags for a match, the appropriately indexed data locations within each set are accessed in parallel. By the time a match is determined, data from all four sets are ready for transmission. The match is used, e.g., as the control input to a multiplexer, to select the data actually transmitted. If there is no match, none of the data is transmitted.

The parallel read operation is much faster since the data is accessed at the same time as the match operation is conducted rather than after. For example, a parallel "tag-and-data" read operation might consume only one memory cycle, while a serial "tag-then-data" read operation might require two cycles. Alternatively, if the serial read operation consumes only one cycle, the parallel read operation permits a shorter cycle, allowing for more processor operations per unit of time.

The gains of the parallel tag-and-data reads are not without some cost. The data accesses to the sets that do not provide the requested data consume additional power that can tax power sources and dissipate extra heat. The heat can fatigue, impair, and damage the incorporating integrated circuit and proximal components. Accordingly, larger batteries or power supplies and more substantial heat removal provisions may be required. What is needed is a cache-management method that achieves the speed advantages of parallel reads but with reduced power consumption.

SUMMARY OF THE INVENTION

The present invention provides for preselection of a set from which data is to be read. The preselection is based on a tag match with a preceeding read. In this case, it is not necessary to access all sets, but only the preselected set. When only one set is selected, a power saving accrues.

The invention provides for comparing a present line address with the line address asserted in an immediately preceding read operation. If the line addresses match, a single-set read can be implemented instead of a parallel read.

The invention provides for checking one or more line locations in a set other than the location used to satisfy a current request for a tag match. A tag match at such a "second" location does not result immediately in included data being accessed; instead a flag (or other indicator) is set indicating the tag match. This indication is used in an immediately succeeding read operation to determine whether the second line location can be preselected for a single-set read operation. If the tag portion of the next requested address matches the tag portion of the previously requested address, and the latter was matched by the tag at the second location, a single-set read can be performed.

The invention has special application to computer systems that have a processor that indicates whether a read address is sequential or non-sequential. By default, e.g., when a read is non-sequential, a parallel read is implemented. If the read is sequential to a previous read that resulted in a cache hit, the type of read can depend on word position within the cache line.

If the word position is not at the beginning of the cache line, then the tag is unchanged. Thus, a hit at the same index and set is assured. Accordingly, a "same-set" read is used. However, if the word position is at the beginning of a line, the index is different and a different tag may be stored at the indexed location. Accordingly, a parallel read can be used.

In a further refinement, if a read that is sequential to a read resulting in a hit corresponds to the end of a cache line, the next index location can be checked. This makes use of the tag-match circuitry that would otherwise be idle in the sequential read. The tag matching can be limited to only the set selected for the current read; alternatively, all sets can be checked. If the next read is sequential, it will correspond to the beginning of a line. However, the tag matching for this read will already have been completed. Accordingly, a single-set read can be performed.

For many read operations, the present invention accesses only one set instead of all the sets that are accessed in a parallel read operation. Yet, there is no time penalty associated with the single-set reads provided by the invention. Thus, the power savings of single-set reads are achieved without sacrificing the speed advantages of the parallel reads. These and other features and advantages of the invention are apparent from the description below with reference to the following drawings.

DESCRIPTION OF THE PREFERRED EMBODIMENTS

Figure 1:
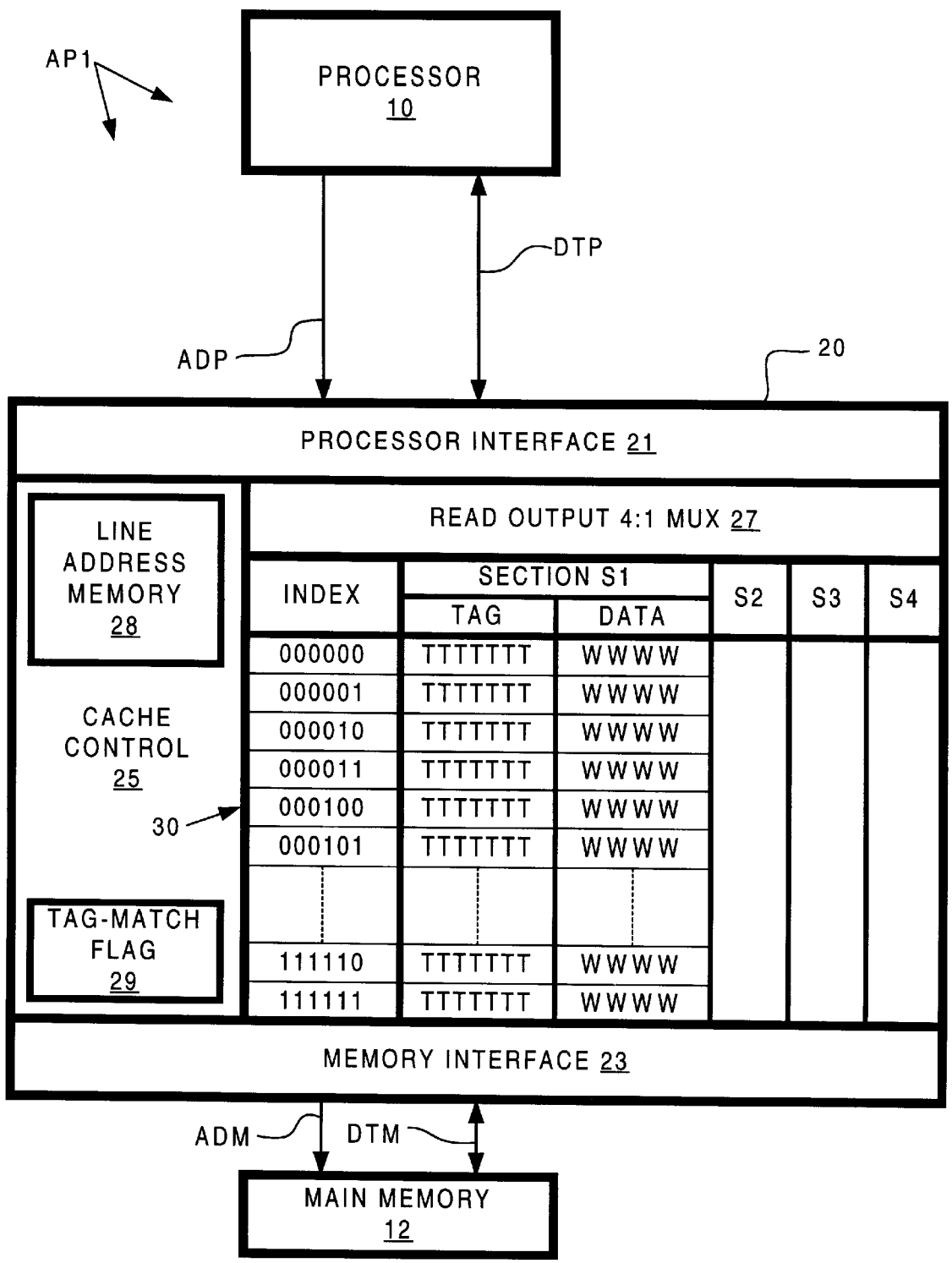
FIG. 1 is a block diagram of a first computer system including a cache in accordance with the present invention.

In accordance with the present invention, a computer system AP1 comprises a data processor 10, main memory 12, and a cache 20, as shown in FIG. 1. Data processor 10 issues requests along a processor address bus ADP, which includes address lines, a read-write control line, a memory-request line, and a sequential-address signal line. Data transfers between cache 20 and processor 10 take place along processor data bus DTP. Similarly, cache 20 can issue requests to memory 12 via memory address bus ADM. Data transfers between cache 20 and memory 12 are along memory data bus DTM.

Cache 20 comprises a processor interface 21, a memory interface 23, a cache controller 25, a read-output multiplexer 27, and cache memory 30. Cache controller 25 includes a line-address memory 28 and a tag-match flag 29. Cache memory 30 includes four sets S1, S2, S3, and S4. Set S1 includes 64 memory locations, each with an associated six-bit index. Each memory location stores a line of data and an associated 22-bit tag. Each line of data holds four 32-bit words of data. Cache sets S2, S3, and S4 are similar and use the same six-bit indices.

Line-address memory 28 includes registers for storing a previous line address and the present line address. In addition, line-address memory 28 provides a validity bit for the previous line address. If this bit indicates invalidity, any comparison results in an inequality.

Figure 2:
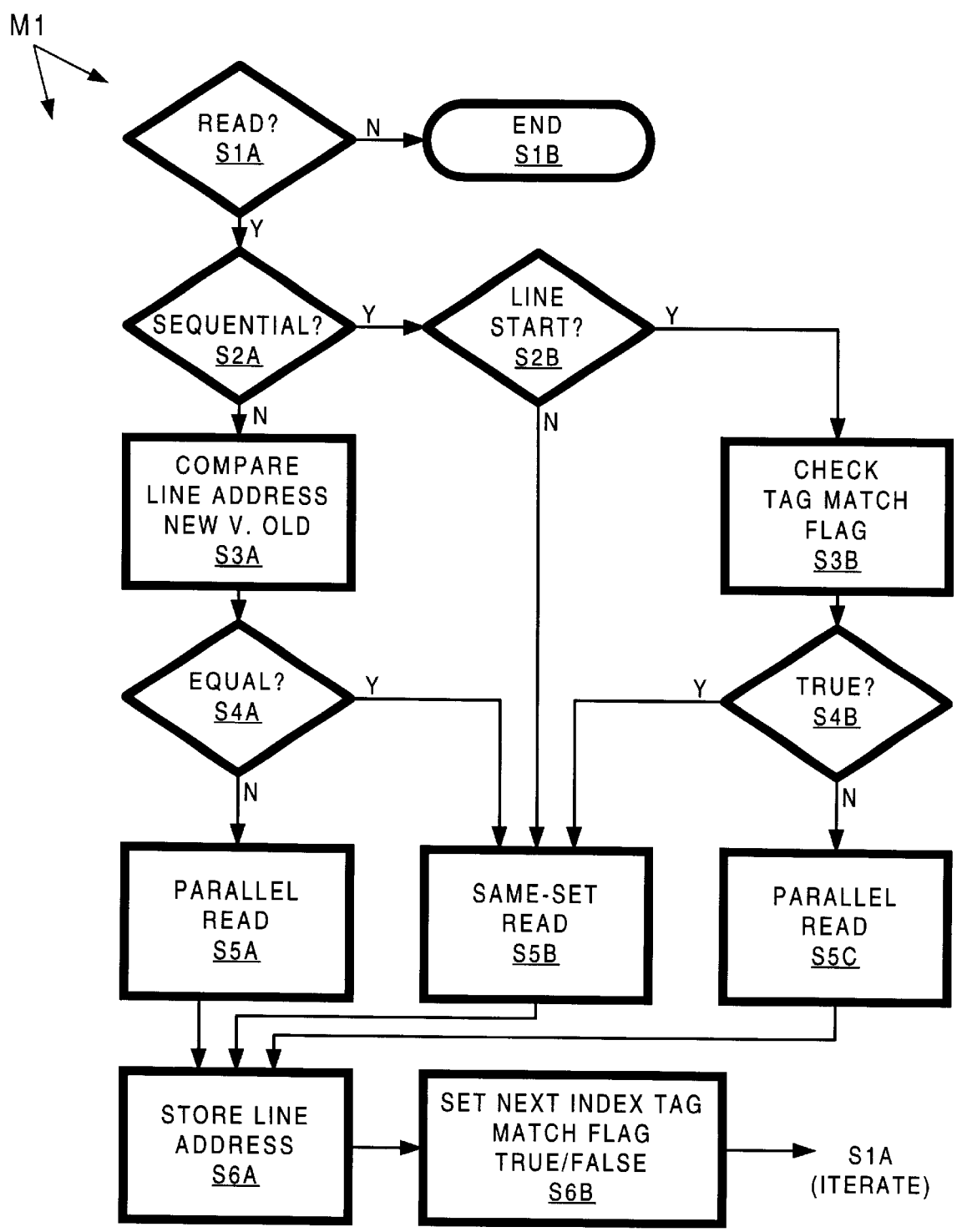
FIG. 2 is a flow chart of the method of the invention as implemented in the cache of FIG. 1.

A method M1 implemented by cache 20 is flow charted in FIG. 2. Step S1A involves determining whether or not a cache-related read operation is being asserted. If, for example, a write operation is asserted initially, method M1 terminates at step S1B. An alternative write method is invoked instead. In an exemplary first iteration of method M1, a wordwide read operation asserts an address with an index portion of 000010 and a word address portion of 11 (the last word of a line).

When a read is asserted, step S2A involves determining whether or not the read is a sequential read. A read is sequential if the asserted address is the successor to the address asserted in an immediately prior read operation. In the case of processor 10, the sequential read is indicated by a corresponding signal level on the sequential read signal line of processor address bus ADP. In this first iteration of method M1, the read is nonsequential; in which case, method M1 proceeds to step S3A.

Step S3A involves comparing the present line address (the asserted address, ignoring the least-significant bits that indicate word position within a cache line and byte position within a word) with the line address of an immediately preceding read operation. Upon initialization, the validity bit associated with the old line address is set to "invalid". So during this first iteration, the comparison indicated at step S4A is negative. If at any time during a sequence of reads, the data at the line location indicated by the line-address memory is invalid, the validity bit is set to "invalid" and any comparison with a new line address has a negative result.

In the example, the first iteration of comparison step S4A has a negative result. Accordingly, the memory locations of all four sets S1, S2, S3, and S4 with the appropriate indexes are accessed in parallel read step S5A. Concurrently, the tags stored at these locations are compared with the tag portion (bits 1–22) of the asserted address. If there is a match, multiplexer 27 is controlled so that data from the set with the matching tag is provided to processor 10 via processor interface 21 and processor data bus DTP.

If there is a miss, cache 20 fetches the line with the requested data from memory 12 via memory interface 23. Cache 20 asserts the line address via memory address bus ADM and receives the requested data along memory data bus DTM. Cache 20 then writes the fetched line to the appropriately indexed location in a selected set in accordance with a replacement algorithm designed to optimize future hits. The read request is then satisfied from the cache location to which the fetched line was written. For this example, assume that the line is stored at set S1, index 000010. The four least-significant bits of the asserted read address determine the location within the line from which the requested data is provided to processor 10.

Whether there was a hit or miss, the requested line address is stored at step S6A. In addition, the tag portion of this line address is compared to the tag stored in the same set at the next index location. In this example, the next index location is at set S1, index 000011. If the tags match, the tag-match flag 29 is set to "true"; if the tags do not match, the flag is set to "false". Method M1 then returns to step S1A for a second iteration.

In this example, the index portion is 000010 as in the first iteration, and the word position is 10 (third word position of four). Thus, the second read operation is non-sequential but the line address is the same. Thus, at step S2A, the result is negative, but the result of the comparison at S3A is positive. Thus, at step S4A, method M1 proceeds to same-set read step S5B.

In step S5B, only one set is accessed. That set is the same set that provided the data to processor 10 in the immediately prior read operation. In this example, set S1 is accessed to the exclusion of sets S2, S3, and S4. This results in a power savings relative to a parallel read.

Method M1 proceeds to step S6A overwritting the previous line address with the current line address. (The net result is no change since the new and old line addresses are the same). At step S6B, the tag at set S1, index 000011, is compared to the tag portion of the requested address. Flag 29 is set accordingly. Again, there is no change because the same comparison is performed in the previous iteration.

Method M1 proceeds to step S1A for a third iteration. In this example, the third iteration involves a sequential read of the last word at the same line address as the second read. Accordingly, method M1 proceeds through steps S1A and S2A to arrive at step S2B. Step S2B involves determining whether the current address points to the start of a line. If a sequential read points to the start of a line, then the previous address pointed to the end of the previous line. Therefore, the sequential read has crossed a line boundary.

In this illustrative third iteration, a line boundary is not crossed. Accordingly, method M1 proceeds to step S5B, so that only set S1 is accessed. Method M1 proceeds through steps S6A and S6B with no net change in line address or flag. A fourth iteration is begun with a return to step S1A.

In this fourth iteration, we assume a sequential read. Since the third read at the third iteration was of the fourth word in a four-word line, the fourth read is to the beginning of the next line (index 000011). Accordingly, in this fourth iteration, method M1 proceeds through steps S1A and S2A to step S2B. In step S2B, the word address bits 00 indicate that the requested data is at the start of a line. When the result of S2B is positive, method M1 proceeds to step S3B.

Step S3B involves checking tag-match flag 29. This was set in the last iteration of step S6B. If the tag at set S1 index 000011 was the same as the tag at set S1, index 000010, it was set to true. This means that the sequential read of this fourth iteration can validly cross the line boundary between indices 000010 and 000011 in set S1. Thus, method M1 proceeds to same-set read step S5B. On the other hand, if the tags differ, the line boundary cannot be validly crossed. Accordingly, a parallel read is conducted at step S5C. (Step S5C is the same as step S5A.)

Both steps S5B and S5C are followed by step S6A. A new line address (corresponding to the new index 000011) is written at step S6A. Also, the tag-match flag is re-determined at step S6B. In this case, the flag indicates whether the tag at set S1 at index 000100 matches the tag at 000011.

In a fifth iteration of method M1, a write operation is assumed. In this case, there is a two-cycle write. As flow charted in FIG. 2, method M1 terminates at step S1B. However, the invention provides for updating the line addresses, as in step S6A, and tag-match flag, as in step S6B, during write operations. When this is done, it is possible for a same-set read to occur immediately after a write operation.

Figure 3:
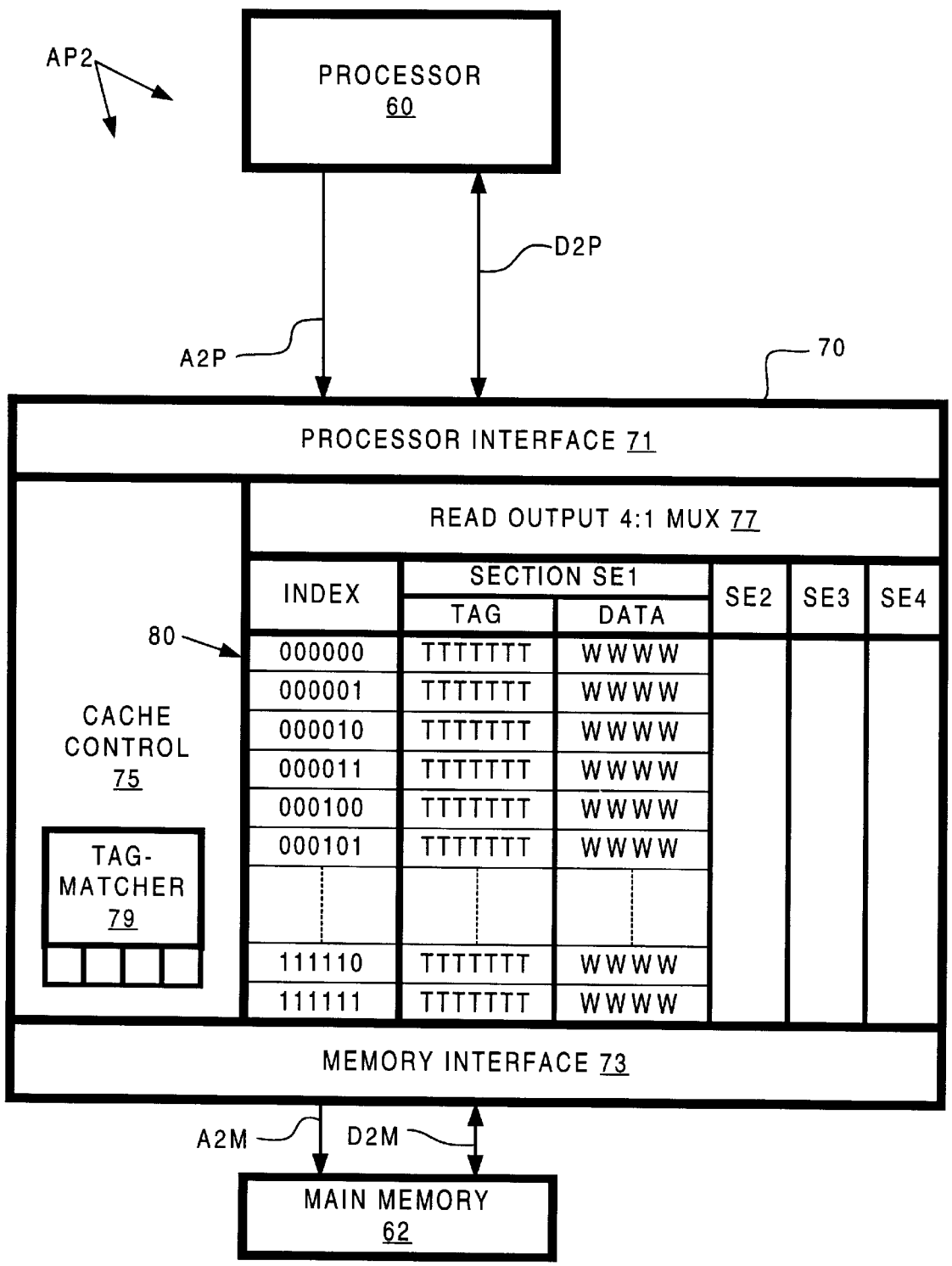
FIG. 3 is a block diagram of a second computer system including a cache in accordance with the present invention.
Figure 4:
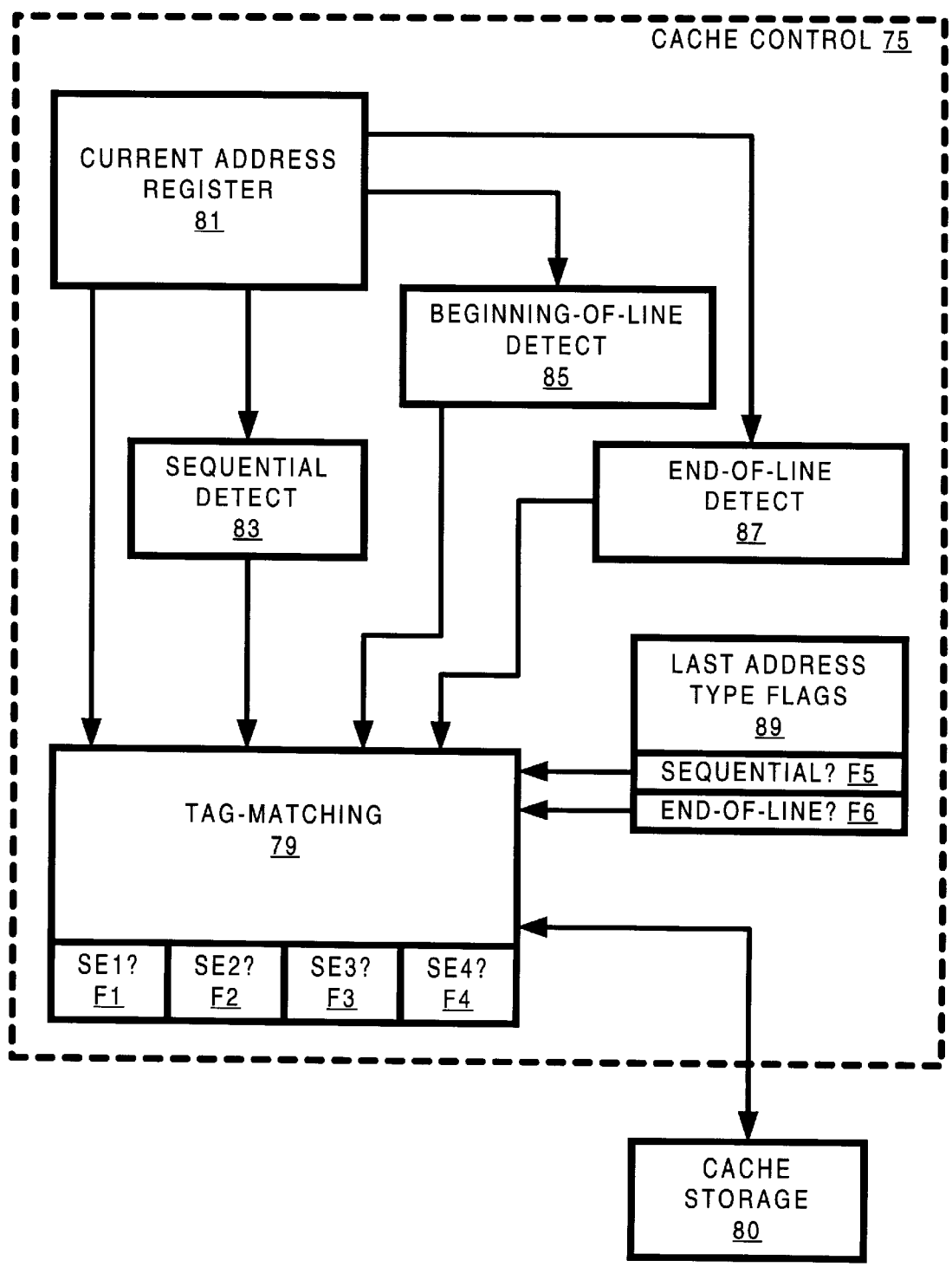
FIG. 4 is a block diagram showing a cache-controller of the cache of FIG. 3.

An alternative computer system AP2 comprises a data processor 60, main memory 62, and a cache 70, as shown in FIG. 3. Data processor 60 issues requests along a processor address bus A2P, which includes address lines, a read-write control line, a memory-request line, and a sequential-address signal line. Data transfers between cache 70 and processor 60 take place along processor data bus D2P. Similarly, cache 70 can issue requests to main memory 62 via memory address bus A2M. Data transfers between cache 70 and memory 62 are along memory data bus D2M.

Cache 70 comprises a processor interface 71, a memory interface 73, a cache controller 75, a read-output multiplexer 77, and cache memory 80. Cache memory 80 includes four sets SE, SE2, SE3, and SE4. Set SE1 includes 64 memory locations, each with an associated six-bit index. Each memory location stores a line of data and an associated 22-bit tag. Each line of data holds four 32-bit words of data. Cache sets SE2, SE3, and SE4 are similar and use the same six-bit indices.

Computer system AP2 differs from computer system AP1 primarily in the arrangement of the respective controllers. Controller 75 comprises tag-matching function 79, a current-address register 81, a sequential-detect function 83, a beginning-of-line detect function 85, an end-of-line detect function 87, and last-address-type flags 89. Tag-matching function 79 has four flags F1, F2, F3, and F4, which correspond respectively to sets SE1, SE2, SE3, and SE4. Each flag indicates whether or not there is a tag match of interest for the respective set. Last-address-type flags 89 include a flag F5 that indicates whether or not the last address was sequential and a flag F6 that indicates whether or not the last address pointed to the end of a cache line.

Current-address register 81 stores not only the current address, but also control data reflecting the transfer type (sequential or non-sequential) and the transfer width (byte, doublet, or quadlet). Register 81 provides the transfer type bit to sequential detect function 83, the word position bits to beginning-of-line detect function 85, and word position and transfer width data to end-of-line detect function 87. Each of the detect functions 83, 85, and 87, provide their respective detection data to tag-matching function 79. In addition, tag-matching function 79 can read last-address-type flags F5 (sequential?) and F6 (end-of-line). Finally, tag-matching function 79 can access cache storage 80 to identify tag matches.

Figure 5:
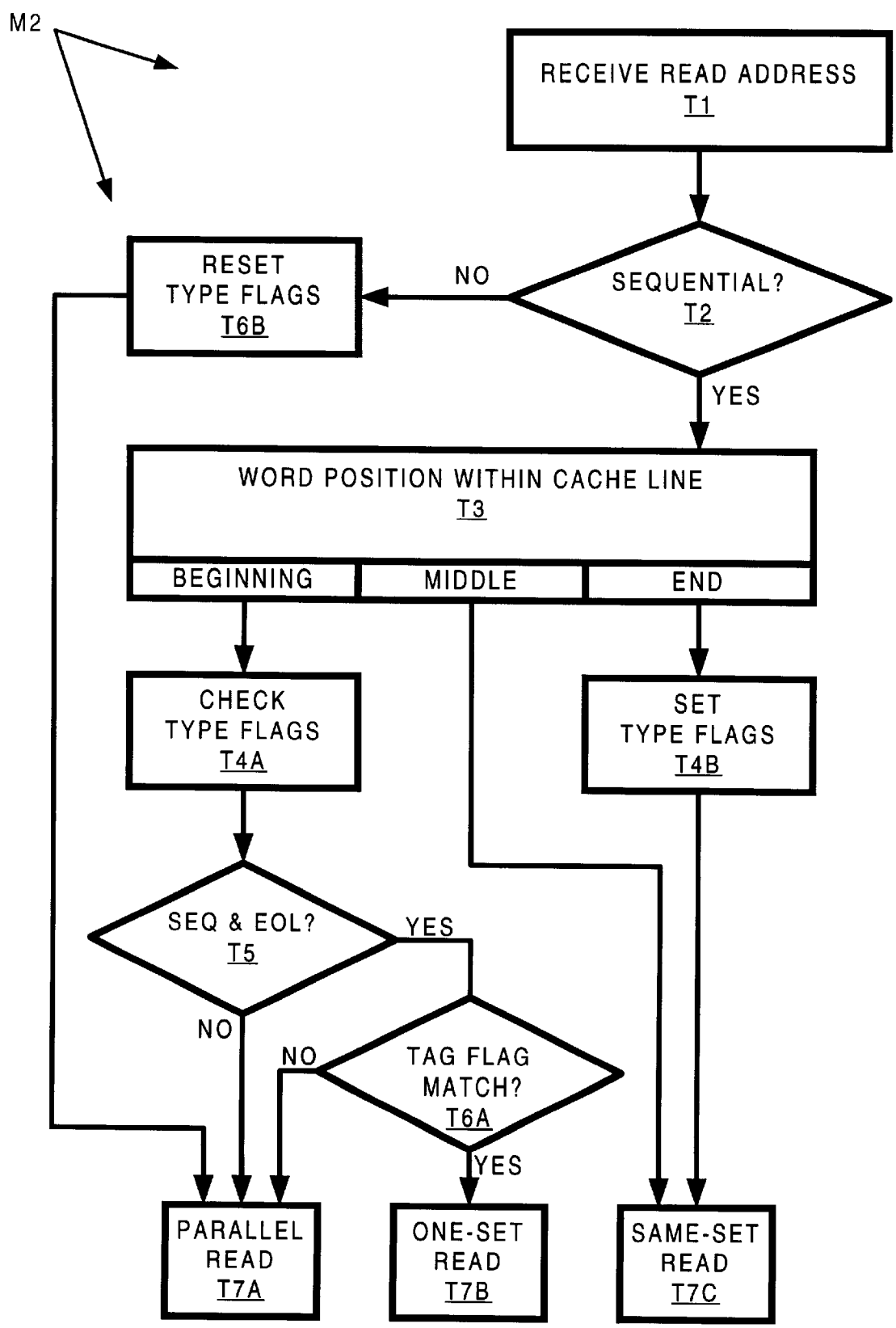
FIG. 5 is a flow chart of a method of the invention as implemented in the cache of FIG. 3.

An iterated method M2 practiced in the context of cache controller 75 is indicated in the flow chart of FIG. 5. A read request is received at step T1. A determination is made whether the read is sequential or non-sequential at step T2. If the read is sequential, the word position within the selected cache line is checked at step T3.

If the word position of a sequential transfer is at the beginning of a cache line, last-address type flags F5 and F6 are checked at step T4A. If from step T5, the previous read request was both sequential and end-of-line, tag match flags F1–F4 are checked at step T6A. If there is no match between the tag of the previous address at the cache location with an index one greater than that indicated by the previous address, a parallel read is performed at step T7A. If a flag F1–F4 indicates such a match, a one-set read is performed, at step T7B, at the incremented index in the set corresponding to the affirmative flag. In an alternative embodiment, there is only one flag that indicates whether there is a match within the same set as in the previous read request.

If the word position is at the end of a cache line, as determined at step T3, end-of-line flag F6 is set. If the end-of-line read is sequential, sequential-type flag F5 is set. In the next iteration of method M2, these flags can be used at step T4A. If the word position of step T3 is neither beginning of line or end of line, a same-set read is performed at step T7C. If at step T2, the read is non-sequential, match flags F1–F4 and sequential flag F5 are reset to negative at step T6B. In this case, method M2 proceeds to a parallel read at step T7A.

In system AP2, tags at a successor index location are only checked when the present read is to the end of a line. This reduces the frequency of such tag checks. On the other hand, the asserted word location must be checked to determine whether or not a tag comparison should be made. Where, as in the present case, the processor provides for different transfer widths, e.g., byte, doublet, and quadlet (word, in this case), the bits to be checked to recognize an end-of-line data request are a function of this width. Thus, this embodiment requires additional complexity to avoid superfluous tag matches.

In another alternative embodiment of the invention, instead of single flag 29, there is a flag associated with each index. During each read operation, all tags in the set from which a read is provided are compared to the tag portion of the read request. The flags are set according to the results. In a subsequent read with an arbitrary index portion, the associated flag can be checked. If the flag indicates true, a single-set read can be implemented. Otherwise, a parallel read operation is implemented. This approach reduces the number of parallel reads, but incurs a cost in cache complexity. These and other variations upon and modifications to the described embodiments are provided for by the present invention, the scope of which is defined by the following claims.

What is claimed is:

1. A cache-management method for a computer system having a processor that indicates whether a read request is sequential or non-sequential, said method comprising the steps of:

when a read address is non-sequential, accessing data from all sets of a cache and then selecting at most one of the sets for providing data to a processor making a read request;

when a read address is sequential to a previous read request resulting in a cache hit and does not correspond to the beginning of a cache line, accessing and providing to said processor data only from the set from which data was provided to said processor in an immediately preceding read operation; and when a read address is sequential to a read request resulting in a cache hit and corresponds to the end of a cache line, determining whether or not there is a tag match between the read address and at least one cache location corresponding to an index one greater than an index indicated by said address.

2. A cache-management method as recited in claim 1 further comprising a step of: when a read address is sequential to a read request resulting in a cache hit and corresponds to the beginning of a cache line, accessing and providing to said processor data only from a set determined to have a tag match in said step of determining whether or not there is a tag match.

* * * * *